US012807522B2

(12) United States Patent
Hazazi et al.

(10) Patent No.: US 12,807,522 B2
(45) Date of Patent: Nov. 24, 2026

(54) SEMI-CLOSED-LOOP SALINITY GRADIENT ENERGY HARVESTING SYSTEM FOR SUSTAINABLE POWER GENERATION AND WATER TREATMENT

(71) Applicant: SAUDI ARABIAN OIL COMPANY, Dhahran (SA)

(72) Inventors: Khalid Yahya Hazazi, Thuwal (SA); Fahd Ibrahim Alghunaimi, Khobar (SA); Saad Hejji Al-Ruwayshid, Dhahran (SA); Norah Waled Aljuryyed, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 364 days.

(21) Appl. No.: 18/531,079

(22) Filed: Dec. 6, 2023

(65) Prior Publication Data

US 2025/0187950 A1 Jun. 12, 2025

(51) Int. Cl.
*C02F 1/44* (2023.01)
*B01D 61/00* (2006.01)
(Continued)

(52) U.S. Cl.
CPC ............ *C02F 1/447* (2013.01); *B01D 61/002* (2013.01); *B01D 61/0024* (2022.08); *B01D 2311/25* (2013.01); *C02F 2103/365* (2013.01)

(58) Field of Classification Search
CPC .... C02F 1/447; C02F 2103/365; C02F 1/445; C02F 2301/046; C02F 1/4695;
(Continued)

(56) References Cited

U.S. PATENT DOCUMENTS 3,906,250 A 9/1975 Loeb
4,171,409 A 10/1979 Loeb
(Continued)

FOREIGN PATENT DOCUMENTS

EP 3643683 A2 4/2020
KR 101328433 B1 11/2013
(Continued)

OTHER PUBLICATIONS

Journal ofMembraneScience429(2013)330â337. (Year: 2013).*
(Continued)

*Primary Examiner* — Pranav N Patel
(74) *Attorney, Agent, or Firm* — Osha Bergman Watanabe & Burton LLP

(57) ABSTRACT

Systems and methods for treating and recycling wastewater using a semi-closed loop salinity gradient energy harvesting system. The system includes a low salinity water stream and a high salinity water stream pumped through a salinity energy harvesting system, which produces a mixed water exit stream pumped through a separator system, producing a high salinity water exit stream and a pure water stream. The method includes pumping a low salinity water stream and a high salinity water stream to a salinity energy harvesting system, operating the salinity energy harvesting system to produce a mixed water exit stream and a produced energy, pumping the mixed water exit stream to a separator system, separating dissolved salts from the mixed water exit stream, and producing a high salinity water exit stream and a pure water stream. The separator system operates using the produced energy from the salinity energy harvesting system.

11 Claims, 3 Drawing Sheets

(51) Int. Cl.
*B01D 61/58* (2006.01)
*C02F 103/36* (2006.01)

(58) Field of Classification Search
CPC ...... C02F 1/048; C02F 1/441; C02F 2103/08; C02F 2303/10; B01D 61/58; B01D 61/002; B01D 61/0021; B01D 61/0022; B01D 61/0024; B01D 61/025; B01D 61/364; B01D 2311/25; B01D 2313/367; F03G 7/015; H01M 8/227
See application file for complete search history.

(56) References Cited

U.S. PATENT DOCUMENTS

| | | | |
|---|---|---|---|
| 10,938,329 | B2 | 3/2021 | Luo et al. |
| 2009/0071902 | A1 | 3/2009 | Stover et al. |
| 2014/0251909 | A1 | 9/2014 | Kelada |
| 2017/0066670 | A1 | 3/2017 | El-Sayed |
| 2022/0410067 | A1 | 12/2022 | Rao et al. |

FOREIGN PATENT DOCUMENTS

| | | | |
|---|---|---|---|
| WO | 2014091199 | A1 | 6/2014 |
| WO | 2023107006 | A2 | 6/2023 |

OTHER PUBLICATIONS

Desalination 120 (1998) 247-262. (Year: 1998).*
International Search Report issued for corresponding international patent application No. PCT/US2024/033835, mailed Sep. 30, 2024 (6 pages).
Written Opinion issued for corresponding international patent application No. PCT/US2024/033835, mailed Sep. 30, 2024 (9 pages).
Soltani, R. et al., "Modeling and simulation of the dual stage pressure retarded osmosis systems," Desalination, 2019 (13 pages).
Non-Final Office Action issued in related U.S. Appl. No. 18/740,281 dated Sep. 10, 2025 (19 pages).
Alvarez-Silva et al., "Practical global salinity gradient energy potential," Renewable and Sustainable Energy Reviews, Mar. 4, 2016, pp. 1387-1395, 9 pages.
Ramon et al., "Membrane-based production of salinity-gradient power," Energy & Environmental Science, Jul. 13, 2011, 12 pages.
Siria et al., "New avenues for the large-scale harvesting of blue energy," Natural Reviews: Chemistry, vol. 1, Article No. 0091, Nov. 8, 2017, 10 pages.
International Search Report issued for corresponding international patent application No. PCT/US2024/058585, mailed Feb. 28, 2025 (6 pages).
Written Opinion issued for corresponding international patent application No. PCT/US2024/058585, mailed Feb. 28, 2025 (8 pages).

* cited by examiner

SEMI-CLOSED-LOOP SALINITY GRADIENT ENERGY HARVESTING SYSTEM FOR SUSTAINABLE POWER GENERATION AND WATER TREATMENT

BACKGROUND

Industrial systems, such as a natural gas refining plant, produce several wastewater streams (e.g., boiler blowdown, brackish water) that are typically discharged and get mixed with other upstream wastewater streams (e.g., produced water) in a water pond. Wastewater streams in a natural gas refining plant are made up of approximately 60% boiler blowdown, 20% produced water, 10% rain harvest, and 10% process wastewater. Moreover, wastewater treatment typically requires a lot of energy, thus produced waters are typically sent to ponds rather than being reused in the industrial process.

FIG. 1A shows a system for wastewater management according to prior art. In FIG. 1, all wastewater streams coming from different upstream operations, such as produced water 102, brackish water 104, and boiler blowdown water 106, are mixed in a collection header 108 and collected in a water pond 110. The approach in FIG. 1. results in wasting the energy of mixing 112 resulting from the salt concentration difference.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a semi-closed loop salinity gradient energy harvesting system, including a first water stream drawn through a low salinity feed line by a first pump upstream of a salinity energy harvesting system and a second water stream drawn through a high salinity feed line by a second pump upstream of the salinity energy harvesting system. The semi-closed loop salinity gradient energy harvesting system also includes a mixed water exit stream drawn through a third pump immediately downstream of the salinity energy harvesting system and a separator system, configured to receive the mixed water exit stream and separate dissolved salts from the mixed water exit stream to produce a high salinity water exit stream and a pure water stream. The semi-closed loop salinity gradient energy harvesting system further includes a recycling line comprising a fourth pump configured to receive the high salinity water exit stream and combine the high salinity water exit stream with the second water stream.

In another aspect, embodiments disclosed herein relate to a method for treating and recycling wastewater, including producing a first water stream, producing a second water stream, where the second water stream has a higher salinity than the first water stream. The method for treating and recycling wastewater also includes pumping, using a first pump, the first water stream to a salinity energy harvesting system, pumping, using as second pump, the second water stream to the salinity energy harvesting system and operating the salinity energy harvesting system to produce a mixed water exit stream and a produced energy. The method for treating and recycling wastewater further includes pumping, using a third pump, the mixed water exit stream to a separator system, where the separator system is configured to receive the mixed water exit stream and separate dissolved salts from the mixed water exit stream to produce a high salinity water exit stream and a pure water stream. The separator system operates using the produced energy from the salinity energy harvesting system. The method further includes recycling, using a fourth pump, the high salinity water exit stream by combining the high salinity water exit stream with the second water stream.

Other aspects and advantages of the claimed subject matter will be apparent from the following description and the appended claims.

DETAILED DESCRIPTION

Embodiments disclosed herein generally relate to a semi-closed-loop system to harvest salinity gradient energy from upstream water resources in industrial processes, using the harvested energy to treat downstream wastewater in a separator system, and subsequently recycling the treated wastewater back to the upstream water resources.

In industrial systems, such as a natural gas processing plant, several steps typically produce water as a by-product. This water is typically discharged into an evaporation pond and is largely either disposed of or allowed to evaporate into the atmosphere as industry does not deem it suitable for re-use opportunities. The present methods and systems advantageously re-use wastewater by using energy generated by salinity gradient harvesting technology to power a separation system which treats wastewater, allowing it to be recycled back into upstream processes.

Figure 1A:
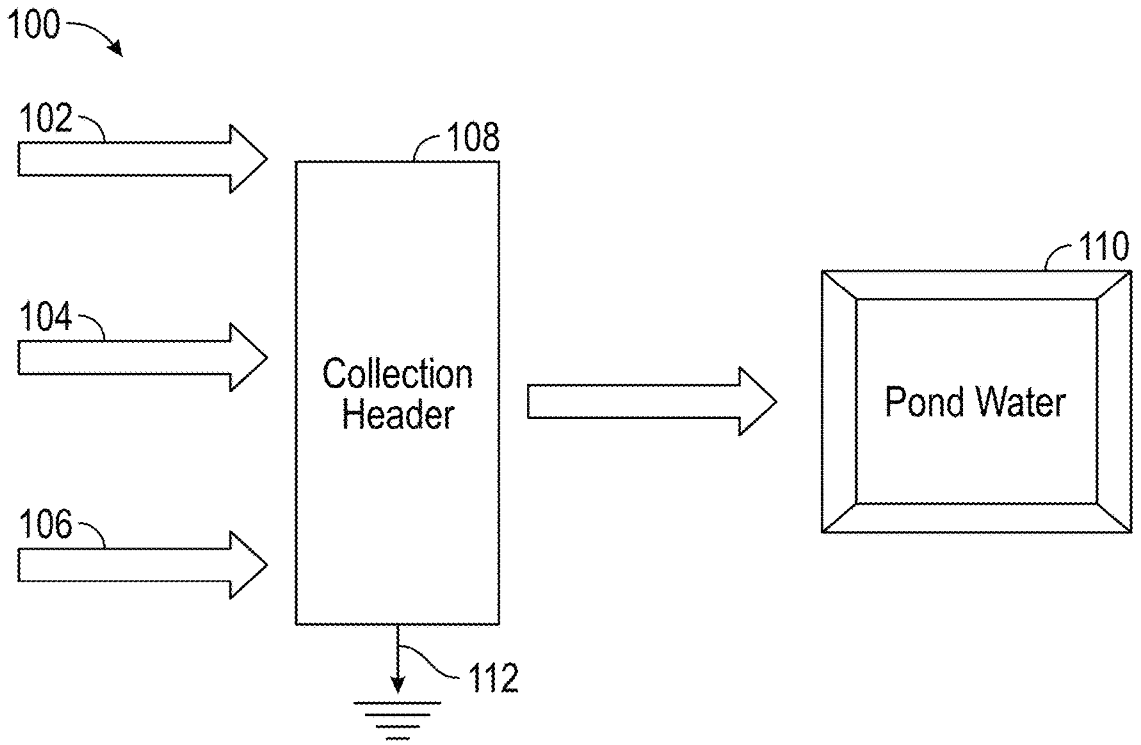
FIG. 1A (Prior Art)
FIG. 1A shows a system for wastewater management according to prior art.
Figure 1B:
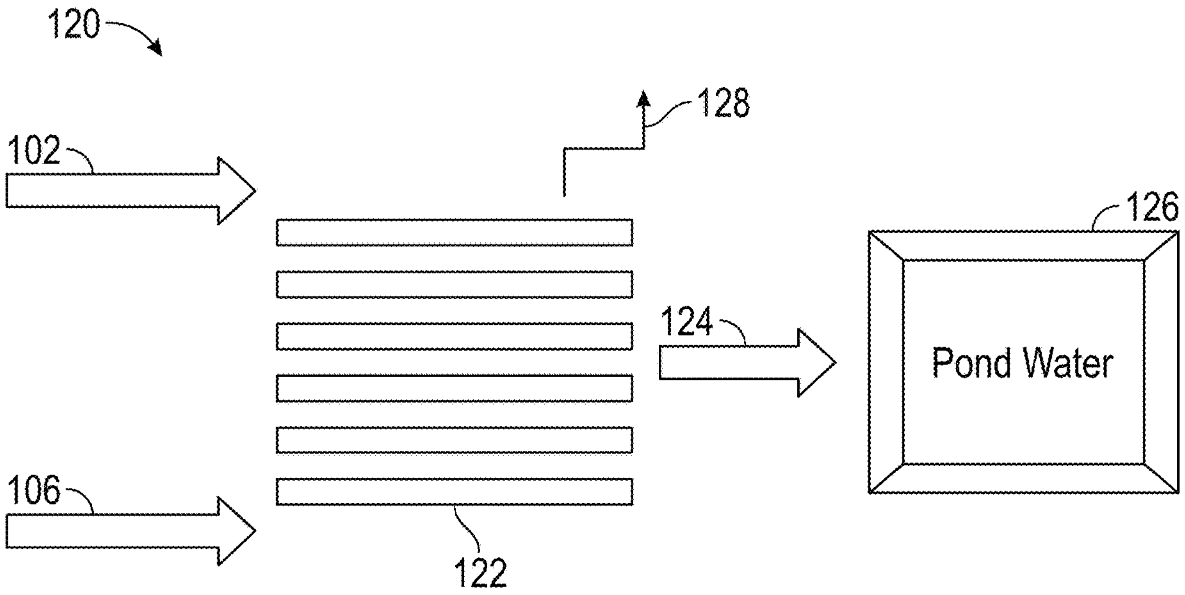
FIG. 1B shows a system for wastewater management.

FIG. 1B shows a system for wastewater management, utilizing upstream wastewater resources for salinity gradient energy harvesting applications. In FIG. 1B, produced water 102 having relatively high salinity and boiler blowdown 106 having relatively low salinity are fed into a salinity energy harvesting system 122 which produces energy 128 that can be used in other processes. In FIG. 1B, the brackish water 124 produced from the energy harvesting system 122 is sent to a water pond 126.

The brackish water stream 124 in FIG. 1B is still sent to a water pond 126 as wastewater. Embodiments herein further improve both the harvested energy 128 and the brackish water 124 produced from the energy harvesting system 122.

Figure 2A:
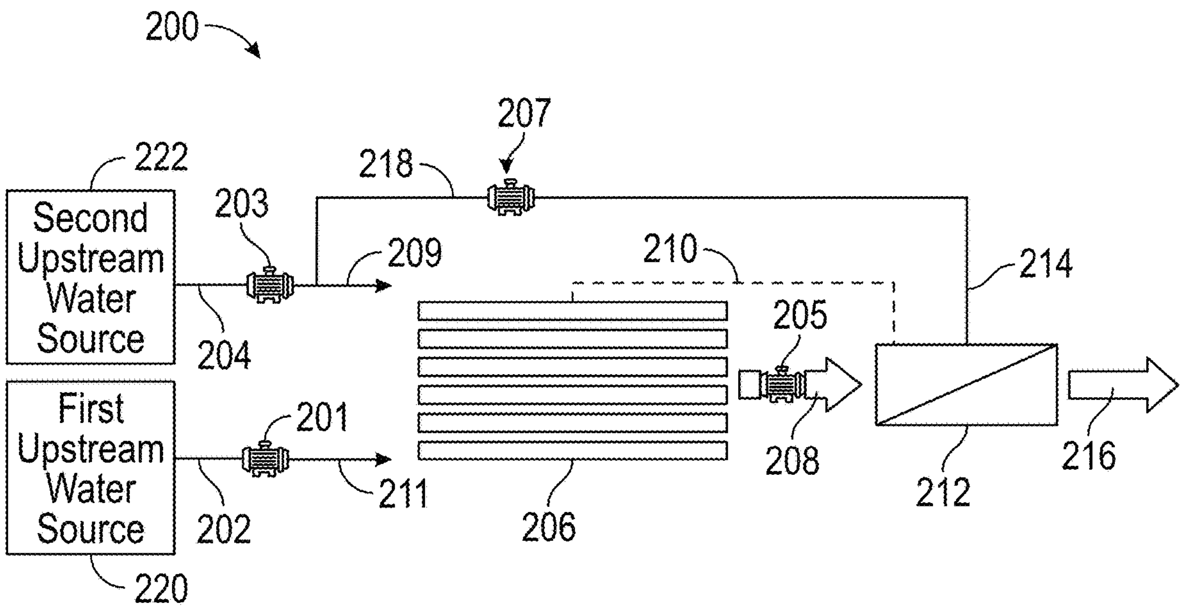
FIG. 2A shows a system for semi-closed-loop salinity gradient energy harvesting according to one or more embodiments disclosed herein.

FIG. 2A illustrates a system for semi-closed-loop salinity gradient energy harvesting according to one or more embodiments. The system 200 may receive several upstream wastewater streams, for example a first water stream 202 and a second water stream 204. While different sources of wastewater may be used, as will be described in the following paragraphs, the first water stream 202 will have a lower salinity than the second water stream 204, which has a relatively higher salinity. The first water stream 202 originates from a first upstream water source 220 and is drawn through a low salinity feed line by a first pump 201 which is located upstream of the salinity energy harvesting system 206. The first pump 201 pressurizes the first water stream 202 to produce a pressurized first water stream 211 having a pressure in a range of range of 1,000,000 to 50,000,000 Pa. Similarly, the second water stream 204 originates from a second upstream water source 222 and is drawn through a high salinity feed line by a second pump 203 upstream of the salinity energy harvesting system 206. The second pump 203 pressurizes the second water stream to produce a pressurized second water stream 209 having a pressure in a range of 100,000 to 500,000 Pa.

Embodiments herein may recover wastewaters from a natural gas processing system. The first water stream may be boiler blowdown, pond water, fresh water, river water, or water streams originating from one or more upstream processes that have relatively low salinity. The first water stream of one or more embodiments has a salinity in a range of from 100 to 1000 mg/kg, such as a lower limit selected from 100, 250 and 500 mg/kg to an upper limit selected from 800, 900, and 1000 mg/kg, where any lower limit may be paired with any upper limit.

In one or more embodiments, the second water stream may be seawater, produced water, brine water, or other water streams originating from one or more upstream processes that have relatively high salinity. The second water stream has a salinity in a range of from 50,000 to 150,000 mg/kg, such as a lower limit selected from 50,000, 75,000 or 100,000 mg/kg to an upper limit selected from 125,000 and 150,000 mg/kg, where any lower limit may be paired with any upper limit. Other optional wastewaters may also be used for the first water stream or the second water stream.

Wastewaters from a natural gas processing system useful in the semi-closed loop energy harvesting system according to embodiments herein may include one or more of produced waters, process waters, and condensate (utility discharge waters). While numerous systems of differing configurations known in the art are used to purify, pressurize, and condense a raw natural gas into desired products (such as liquid natural gas (LNG) and compressed natural gas (NG), among other products), each of these natural gas processing systems generate wastewaters by removing water from the produced fluids and the raw natural gas. These natural gas processing systems also generate wastewaters, primarily in the form of condensate, resulting from the use of steam to drive turbines, as a heating fluid to provide heat to one or more heat exchangers, and other utility uses within the natural gas processing system.

Each of these natural gas processing wastewaters, both from the process side and the utility side of the natural gas processing system, may be collectively or individually accumulated, or a combination of collective and individual accumulation, and supplied to the energy harvesting system according to embodiments herein. For example, produced and process waters may be collectively accumulated and supplied while the condensate may be recovered and supplied by a separate system, such as a condensate collection system. As another example, each of the produced, process and utility wastewaters may be fed to a common collection system for subsequent supply to a salinity energy harvesting system according to embodiments herein. In yet other embodiments, each of the produced, process and utility wastewaters may be separately fed directly to a salinity energy harvesting system.

Keeping with FIG. 2A, the first water stream 202 and the second water stream 204 enter a salinity energy harvesting system 206. The salinity energy harvesting system may use technology such as reverse electrodialysis (RED) or pressure retarded osmosis (PRO). Regardless of the technology used, the salinity energy harvesting system 206 operates on the principle that random mixing of two or more water streams, one containing a high salinity value and one containing a low salinity value is an exothermic process which generates an energy of mixing (also known as the Gibbs free energy). If the energy is not captured, the system rapidly reaches chemical equilibrium and energy is lost to the surroundings. Therefore, the salinity energy harvesting system 206 of one or more embodiments is capable of receiving two or more streams, having varying salinity values, mixing them to create energy, and capturing and storing the energy for re-use.

In one or more embodiments, the salinity energy harvesting system may be a RED or a PRO system. Both technologies use membranes to allow preferential transport of species by separating two reservoirs (streams) filled with fresh (lower salinity) and sea (higher salinity) water. In the case of PRO, the freshwater (low salinity) permeates to the highly-saline side through a semipermeable membrane, resulting in a pressure surge at the highly saline side which can be utilized to rotate turbine blades and produce electricity. While in the case of RED, the electricity is generated because of the transport of salt ions through ion permselective membranes, where the positive salt ions (e.g., sodium) permeate to the less-saline side, and the negative ions (e.g., chloride) permeate to the highly saline side.

Figure 2B:
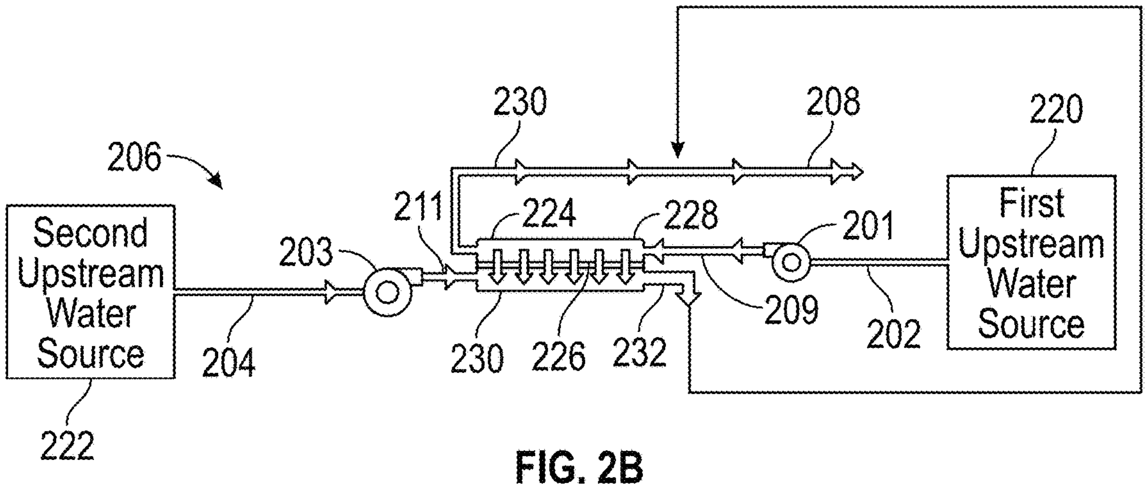
FIG. 2B shows an example energy harvesting system according to one or more embodiments.

One example of an energy harvesting system useful in embodiments herein is shown in FIG. 2B, illustrating a pressure retarded osmosis (PRO) process. The system 206 contains a and a first water stream 202 and a second water stream 204. The first water stream may originate from a first upstream water source 220 and is drawn through the first water stream 202. There is a first pump 201 in the first water stream 202. The first pump 201 pressurizes the first water stream 202, producing a pressurized first water stream 211 at a range of 100,000 to 500,000 Pa.

The first water stream 202 may originate from the first upstream water source 220 including boiler blowdown, pond water, fresh water, river water, or water streams originating from one or more upstream processes that have relatively low salinity.

A semi-permeable membrane housing 224 includes a container and a semi-permeable membrane 226 dividing the container 224. The semi-permeable membrane 226 may be constructed of solid-state porous materials, lamellar materials, or two-dimensional materials. Examples of solid-state porous materials include porous alumina, polymer Janus particles, and perfluorinated NAFION™. An example of a lamellar material is carbon nitride. Examples of two-dimensional materials include graphene and graphene oxide. Examples of commercially available semi-permeable membranes suitable for this application include PCA PC-SK, Qianqiu, sPEEK 65, and FUMASEP FKD. The salinity of the high salinity fluid impacts the structure of the semi-permeable membrane. Generally, a multilayered semi-permeable membrane is used for high salinity fluids in PRO applications. In RED applications, ion selective membranes for sequential permeation of the salt ions are used.

Referring back to FIG. 2B, the container is divided into a low salinity side of the semi-permeable membrane housing 228 and a high salinity side of the semi-permeable membrane housing 224, allowing for the semi-permeable membrane to operate in a counterflow arrangement. A counterflow arrangement is when two feed streams flowing to the semi-permeable membrane housing 228 travel in opposing directions. In some embodiments, the semi-permeable membrane divides the container vertically, meaning the semi-permeable membrane is vertical and divides the container into two side portions. The orientation illustrated in FIG. 2B, the orientation divides the two sides of the container horizontally. This visual orientation is for process illustration purposes, to clearly show both sides of the semi-permeable membrane. However, other configurations for the membrane and the respective high and low salinity sides of the housing may be used as appropriate.

The low salinity side of the semi-permeable membrane housing 228 is in fluid communication with the pressurized first water stream 211. The pressurized first water stream 211 provides a low salinity fluid to the low salinity side of the semi-permeable membrane housing 228 that permeates an amount of the low salinity fluid through the semi-permeable membrane 226. The remaining low salinity fluid that does not permeate exits to the low salinity side of the semi-permeable membrane housing 228 through a low salinity exit line 230. In some embodiments, the low salinity exit line 230 may be combined with the mixed water exit stream 208 and sent by the third pump 205 to the separator system 212, as illustrated in FIG. 2A. A second upstream water source 222 is drawn through the second water stream 204. There is a second pump 203 in the second water stream 204. The second pump 203 pressurizes the second water stream 204, producing a pressurized second water stream 209 remaining below osmotic pressure, at a range of 1,000,000 to 50,000,000 Pa. The high salinity side of the semi-permeable membrane housing 224 is in fluid communication with the pressurized second water stream 209. The low salinity fluid that permeates through the semi-permeable membrane 226 passes through the membrane to the high salinity side of the semi-permeable membrane housing 224. This permeated low salinity fluid combines with the pressurized high salinity fluid provided by the pressurized second water stream 209 to dilute and further pressurize the pressurized high salinity fluid, producing a pressurized mid-salinity fluid at a range of 5,000,000 to 100,000,000 Pa. This pressurized mid-salinity fluid flows through the mid-salinity exit line 232 out of the semi-permeable membrane housing. In some embodiments, the mid-salinity exit line 232 may be combined with the mixed water exit stream 208 and sent by the third pump 205 to the separator system 212, as illustrated in FIG. 2A.

The second water stream 204 may originate from the second upstream water source 222 including seawater, produced water, brine water, or other water streams originating from one or more upstream processes that have relatively high salinity.

Another example of a salinity energy harvesting system 206 useful for one or more embodiments is a reverse electrodialysis (RED) process. RED involves the transport of (typically, salt) ions through a series of alternating positively and negatively charged exchange membranes. Each of the membranes contains fresh water on one side and salt water on the other side. The positively charged anion exchange membranes allow only negatively charged ions to pass and the negatively charged cation exchange membranes allow only positively charged ions to pass. Therefore, positive and negative ions migrate in opposite directions, from salt water into fresh water, creating positive and negative poles, as in a battery. As a result, voltage is generated over each membrane and the total voltage of the system is the sum of the voltages over all membranes. Connecting the two poles by a conductor causes an electrical current to flow. In summary, the RED process harvests counterion fluxes across ion exchange membranes to generate a Nernst potential between two saline solutions of different concentrations.

Turning back to FIG. 2A, the controlled mixing of upstream wastewater streams, such as a first water stream 202 having low salinity and a second water stream 204 having high salinity, using advanced technology (e.g., reverse electrodialysis (RED), pressure retarded osmosis (PRO), etc.) result in harnessing energy using the salinity energy harvesting system 206. The harnessed energy 210 can then be utilized to power one or more applications including wastewater treatment. Upon exiting the salinity energy harvesting system 206, a mixed water exit stream 208 is produced. The mixed water exit stream 208 may then be drawn through a third pump 205 located downstream of the salinity energy harvesting system 206 and sent to a separator system 212. Embodiments disclosed herein use the harnessed energy 210 to power said separator system 212 and treat the mixed water exit stream 208. The separator system 212 is configured to receive the mixed water exit stream 208, separates dissolved salts from the mixed water exit stream 208, and produces a high salinity exit stream 214 and a pure water stream 216.

The separator system 212 according to one or more embodiments may be any system capable of separating salt from a mixed water exit stream 208 to produce a high salinity exit stream 214 and a pure water stream 216. A "pure water" stream is defined herein as having a total dissolved solids (TDS) value of less than about 2000 ppm. In some embodiments, the pure water stream is recycled to a process in a natural gas refining plant, or the pure water stream is exported and/or sold.

Examples of separator systems useful in one or more embodiments disclosed herein may include, but are not limited to a membrane separator system, a membrane distillation system, a distillation system, or a deionization system.

The separator system of one or more embodiments may include a membrane separator system that relies on reverse osmosis technology, for example. In reverse osmosis systems, a contaminant, such as salt, is removed by passing a water stream through a semi-permeable membrane. Pressure exerted from the flowing water stream pushes the water stream through the semi-permeable membrane which removes dissolved salts. The dissolved salts are sent to a waste stream and a pure water stream is produced. The reverse osmosis process may include a series of semi-permeable membranes to improve the capacity to remove salt from the water stream.

The separator system of one or more embodiments may include a distillation system. The distillation process relies on differences in boiling points of different substances. During distillation, a saline water stream is heated to produce water vapor, which is then condensed to produce fresh water. There are several different types of distillation systems which may be used to desalinate water, including, but not limited to, a multistage flash distillation system, a multiple effect distillation system, a vapor compression distillation system, a membrane distillation system, and a dual purpose distillation system. The distillation system of one or more embodiments may be any of the example systems listed, or combinations therein.

The separator system of one or more embodiments may include a deionization system. A deionization system removes dissolved salts and minerals from a water stream using an electrically charged resin bed. The electrically charged resin bed may be positively or negatively charged, such that when the water stream is passed through the electrically charged resin bed, particles in the water stream having the opposite charge are attracted. The deionization system may include at least one positively and negatively charged resin beds in series to remove both negatively and positively charged ions, respectively. Deionization systems must be flushed to regenerate the electrical charge and remove collected ions.

Keeping with FIG. 2A, the high salinity exit stream 214 produced from the separator system 212 may be recycled back into upstream processes. For example, the high salinity exit stream 214 may be pumped by a fourth pump 207 to produce a pressurized high salinity exit stream 218. The pressurized high salinity exit stream 218 may then be combined with the pressurized second water stream 209 at a location upstream of the salinity energy harvesting system 206. The pure water stream 216 produced from the separator system 212 may be re-used in upstream processes such as a boiler feed stream, or other processes requiring pure water.

Figure 3:
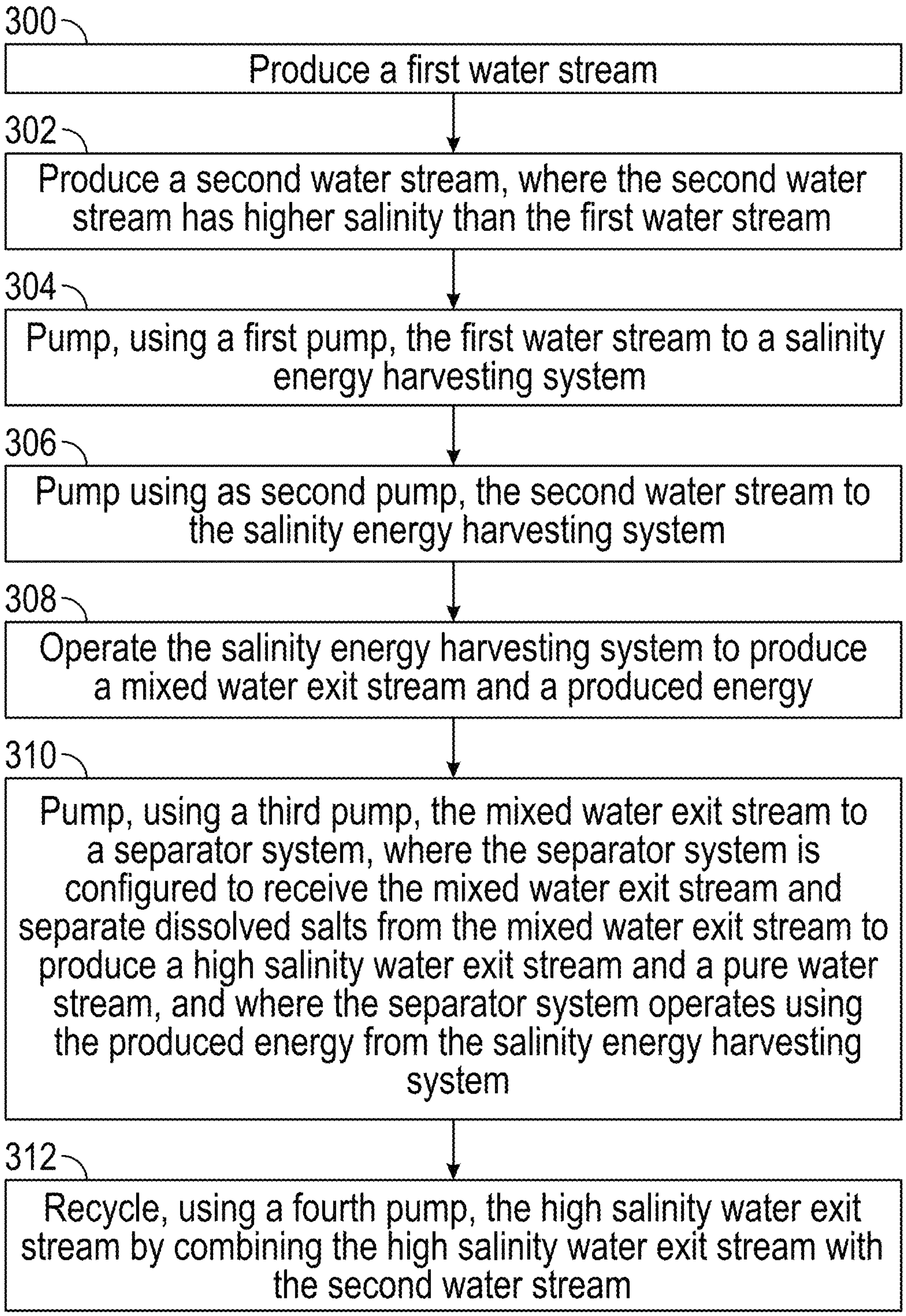
FIG. 3 shows a flowchart in accordance with one or more embodiments disclosed herein.

Embodiments disclosed herein also relate to a method for treating and recycling wastewater. FIG. 3 depicts a flowchart in accordance with one or more embodiments disclosed herein. In step 300, a first stream is produced where the first stream comprises low salinity water. In some embodiments, the first water stream includes boiler blowdown, pond water, fresh water, river water, or combinations thereof. In some embodiments, the first water stream has a salinity in a range of from 100 to 1000 mg/kg. In step 302, a second water stream is produced, where the second water stream contains high salinity. In some embodiments, the second water stream includes seawater, produced water, brine water, and combinations thereof. In some embodiments, the second water stream has a salinity in a range of from 50,000 to 150,000 mg/kg.

Keeping with FIG. 3, in step 304, pump, using a first pump, the first water stream to a salinity energy harvesting system and in step 306, pump using as second pump, the second water stream to the salinity energy harvesting system. In step 308, operate the salinity energy harvesting system to produce a mixed water exit stream and a produced energy. In step 310, pump, using a third pump, the mixed water exit stream to a separator system, where the separator system is configured to receive the mixed water exit stream and separate dissolved salts from the mixed water exit stream to produce a high salinity water exit stream and a pure water stream, and where the separator system operates using a portion of the produced energy from the salinity energy harvesting system. In some embodiments, the separator system is selected from the group consisting of membrane separator system, a distillation system, and a deionization system. Finally, in step 312, recycle, using a fourth pump, the high salinity water exit stream by combining the high salinity water exit stream with the second water stream. In some embodiments, a second portion of the produced energy is used to power a process in a natural gas refining plant, or a second portion of the produced energy is exported and/or sold.

Embodiments of the present disclosure may provide at least the following advantages. Energy requirement for water treatment applications, specifically wastewater treatment, pose a critical challenge. However, in this method and system, a semi-closed-loop system firstly harvests the salinity gradient energy of upstream water resources, then utilizes such harvested energy to treat the brackish water using a separator. Such an approach will result in a sustainable energy production, wastewater treatment, and ultimately upstream water recycling to be fed into other upstream applications. In summary, the semi-closed-loop salinity gradient energy harvesting system disclosed herein will result in a sustainable energy production, wastewater treatment, and ultimately water recycling to be fed into several upstream applications.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for treating and recycling wastewater, comprising:
- producing a first water stream;
- producing a second water stream, wherein the second water stream has a higher salinity than the first water stream;
- pumping, using a first pump, the first water stream to a salinity energy harvesting system;
- pumping, using as second pump, the second water stream to the salinity energy harvesting system;
- operating the salinity energy harvesting system to produce a mixed water exit stream and a produced energy;
- pumping, using a third pump, the mixed water exit stream to a separator system, wherein the separator system is configured to receive the mixed water exit stream and separate dissolved salts from the mixed water exit stream to produce a high salinity water exit stream and a pure water stream and wherein the separator system operates using the produced energy from the salinity energy harvesting system; and
- recycling, using a fourth pump, the high salinity water exit stream by combining the high salinity water exit stream with the second water stream at a combination point, wherein a salinity of the high salinity water exit stream exiting the separator system is equal to a salinity of the high salinity water exit stream at the combination point.

2. The method of claim 1, wherein the first water stream comprises boiler blowdown, pond water, freshwater, river water, or combinations thereof.

3. The method of claim 1, wherein the second water stream comprises seawater, produced water, brine water, or combinations thereof.

4. The method of claim 1, wherein the separator system is selected from the group consisting of membrane separator system, a distillation system, and a deionization system.

5. The method of claim 1, wherein the first water stream has a salinity in a range of from 100 to 1000 mg/kg.

6. The method of claim 1, wherein the second water stream has a salinity in a range of from 50,000 to 150,000 mg/kg.

7. The method of claim 1, wherein a second portion of the produced energy is used to power a process in a natural gas refining plant.

8. The method of claim 1, wherein a second portion of the produced energy is exported or sold.

9. The method of claim 1, wherein the pure water stream is recycled to a process in a natural gas refining plant.

10. The method of claim 1, wherein the pure water stream is exported or sold.

11. The method of claim 1, wherein the first water stream comprises boiler blowdown and, optionally, one or more selected from the group consisting of pond water, freshwater, river water, or combinations thereof.

* * * * *